United States Patent [19]

Miyano

[11] Patent Number: 5,694,172
[45] Date of Patent: Dec. 2, 1997

[54] METHOD AND APPARATUS FOR REPRODUCING PICTURE DATA

[75] Inventor: Yuichi Miyano, Kanagawa-ken, Japan

[73] Assignee: Kabushiki Kaisha Toshiba, Kawasaki, Japan

[21] Appl. No.: 389,696

[22] Filed: Feb. 14, 1995

[30] Foreign Application Priority Data

Feb. 14, 1994 [JP] Japan ................ P0-017276

[51] Int. Cl.⁶ .................................................. H04N 7/24
[52] U.S. Cl. ...................... 348/415; 386/68; 386/111
[58] Field of Search ................................... 348/384, 390, 348/400–405, 409–413, 415, 416; 358/312, 335, 342; 360/10.1, 10.3; 386/46, 68, 81, 82, 109–112, 124; H04N 5/76, 5/78, 7/130

[56] References Cited

U.S. PATENT DOCUMENTS

| | | | |
|---|---|---|---|
| 4,931,879 | 6/1990 | Koga et al. | 358/335 |
| 5,068,727 | 11/1991 | Haghiri et al. | 348/412 |
| 5,377,051 | 12/1994 | Lane et al. | 360/10.1 |
| 5,453,801 | 9/1995 | Kim | 348/416 |

FOREIGN PATENT DOCUMENTS 458686  2/1992  Japan .

OTHER PUBLICATIONS

Hitoshi Takaie and Hiroyuki Kobayashi; "A Principle of A Changing of Picture Number and A Realization About C Language"; magazine article; Jan. 1993; pp.183–199; Japanese publication.

Yasuo Katayama; "An Outline of MPEG and A Trend About Standard of MPEG"; magazine article; Aug. 1992; pp. 124–146; Japanese publication.

*Primary Examiner*—Richard Lee
*Attorney, Agent, or Firm*—Cushman Darby & Cushman IP Group of Pillsbury Madison & Sutro LLP

[57] ABSTRACT

Apparatus for reproducing picture data includes a variable length decoder and Huffman decoder, an inverse discrete cosine transformer (IDCT) coupled to the Huffman decoder, an intra-frame unit for prediction and motion compensation coupled to the IDCT, a memory coupled to the intra-frame unit, a buffer memory coupled to an output of the intra-frame unit, a resolution changer coupled to the buffer memory, a frames in/out unit coupled to the output of the resolution changer; a unit for changing the picture frame time table coupled to the output of the frames in/out unit, a frame memory coupled to the changing unit, and a selector for selecting picture data for reproduction from the buffer memory or the changing unit.

5 Claims, 9 Drawing Sheets

FIG. 6(A)

MEMORY MAP
MEMORY FOR ESTIMATING

MEMORY FOR DECODING CONDUCT

REFERENCE FRAME I FOR BEFORE

REFERENCE FRAME II FOR THE FRONT AND THE REAR

— 25

BUFFER MEMORY OF OUTPUT

OUTPUT BUFFER — 26

FRAME MEMORY

| F0 (LOW RESOLUTION : A PART OF 1 FRAME) |
| F1 (LOW RESOLUTION : A PART OF 1 FRAME) |
| F2 (LOW RESOLUTION : A PART OF 1 FRAME) |
| F3 (LOW RESOLUTION : A PART OF 1 FRAME) |

MEMORY ACCESS MAP
MEMORY FOR ESTIMATING

WT/RD
(ESTIMATING)   | F0 | F1 | F2 | F3 | F0 | F1 | F2 | F3 | F0 | F1 |

FRAME MEMORY

WT
(RESOLUTION CHANGE)   | F0 | F1 | F2 | F3 | F0 | F1 | F2 | F3 | F0 | F1 |

RD
(TIME ORDER CHANGE)   | F3 | F2 | F1 | F0 | F3 | F2 | F1 | F0 | F3 | F2 |

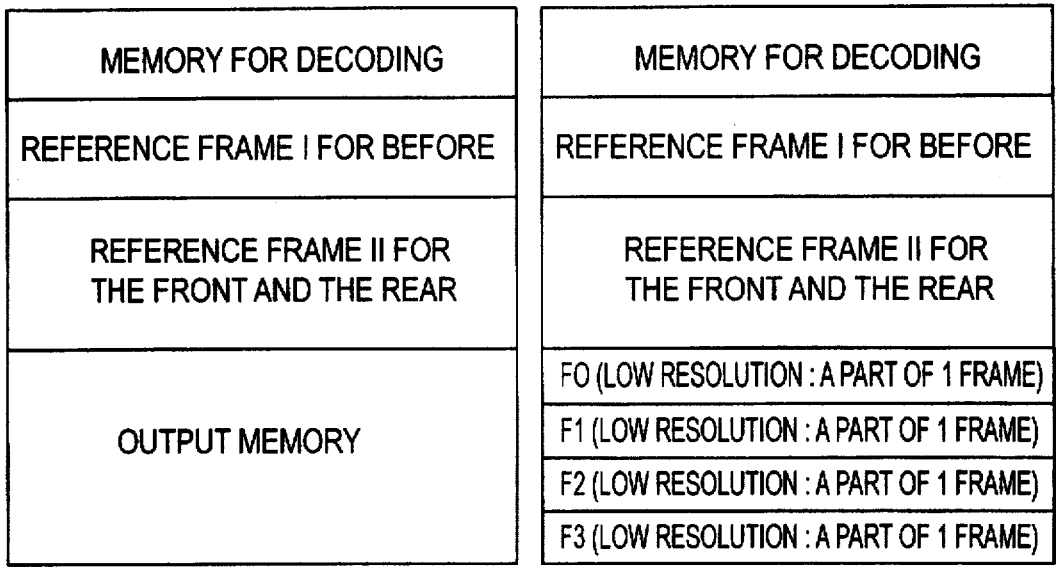

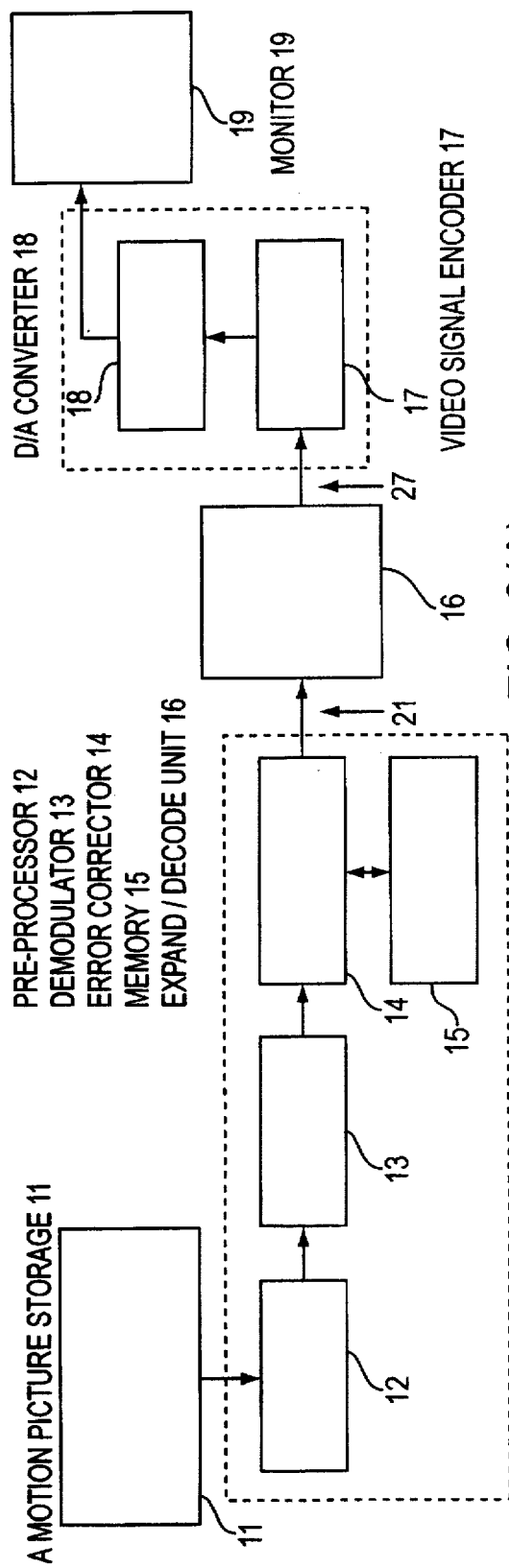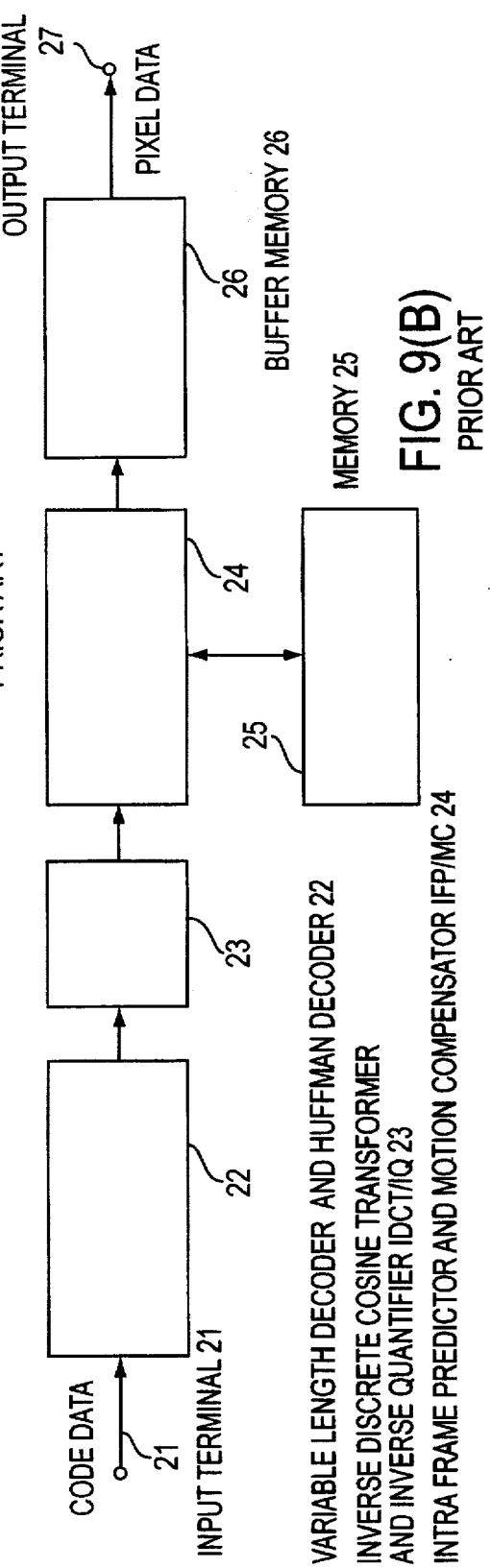
FIG. 9(A) PRIOR ART
FIG. 9(B) PRIOR ART

METHOD AND APPARATUS FOR REPRODUCING PICTURE DATA

BACKGROUND OF THE INVENTION

1. Field of the Invention

The present invention relates to a method and apparatus for reproducing picture data.

2. Description of the Related Art

FIG. 9(A) shows an apparatus for reproducing picture data from a storage media for display on a monitor. FIG. 9(B) shows a decoder that expands compressed picture data and decodes compressed picture data in FIG. 9(A). As shown in FIG. 9(A) and 9(B), a motion picture storage unit 11 includes a storage media and a reproducing unit. A signal from motion picture storage unit 11 is input to a pre-processor 12. The pre-processor 12 amplifies and equalizes the signal from unit 11. The signal from the pre-processor 12 is provided to demodulator 13 which demodulates the pre-processor signal. The signal from demodulator 13 is error corrected by error correction unit 14 using memory 15. The expand/decode unit 16 extends and decodes the signal from error correction unit 14 and outputs picture data (R,G,B), picture data (Y/Cb/Cr) or picture data (CMYK). This picture data is provided to video signal encoder 17 which converts the signal into a video signal (e.g., PAL or NTSC). The video signal is provided to D/A converter 18 which converts the video signal into an analog video signal. The analog video signal from D/A converter 18 is then provided to display monitor 19 which displays the video signal.

FIG. 9(B) shows the expand/decode unit 16 in FIG. 9(A). The compressed picture data received on input terminal 21 is provided to the variable length decoder and Huffman decoder 22 which decodes the compressed picture data. The decoded picture data is then input to IDCT/IQ unit 23 which performs an inverse discrete cosine transform and inverse quantification on the picture data. Picture data from IDCT/IQ unit 23 is input to IFP/MC unit 24 which performs prediction and compensation using memory 25. Picture data from IFP/MC unit 24 is then output at output terminal 27 through buffer memory 26 for picture display.

Variable length decoding and Huffman decoding restores compressed picture data by entropy coding. Inverse discrete cosine transforming restores compressed data by direct-alternating interchange. Inverse quantification restores quantified compressed data. Intra-frame coding is a method of forming an estimated picture based on the mutual relationship of a picture and an adjoining block of the same frame. This coding is effective for compressing a simple picture. Inter-frame prediction coding is a method of forming an estimated picture using a picture of an adjoining frame. This coding is effective for high compression when a motion picture experiences only a small change per unit time. A method of "H.261" of ITU (International Telecommunication Union) can be employed to make use of the forward estimate frame. A method of MPEG1 and 2 (Moving Picture Experts Group Phase 1 and Phase 2) is possible to make use of the forward estimate frame and the backward estimate frame.

As stated above, reproduction and reverse reproduction is necessary with a large quantity. So far, a simple method of reverse reproduction can be practiced by providing memory between expand/decode unit 16 and video signal encoder 17. Some frames of picture data are stored in the memory, and the frames are reproduced in reverse frame order. When using an H.261 method, picture data must be maintained for at least part of the refresh cycle. When using an MPEG method, picture data of one unit of a prescribed GOP (Group of picture) must be maintained. This is because picture data cannot be reproduced without using reference picture data. It is also necessary to change the order in which a reference picture data and a front part of the reference picture were stored.

SUMMARY OF THE INVENTION

Accordingly, the invention is directed to a method and an apparatus for reproducing picture data that substantially obviates one or more problems due to limitations and disadvantages of the related art.

To achieve the advantage of the invention and in accordance with the purpose of the invention, as embodied and broadly described below, the invention is directed to an apparatus for reproducing picture data. The apparatus comprises means for decoding compressed picture data; a resolution changer to change the resolution of decoded picture data; a memory for storing the picture data with changed resolution; means for reproducing the picture data from the memory; and means for controlling the order for reproducing the picture data from the memory.

Further, in accordance with the present invention, there is provided an apparatus for reproducing picture data. The apparatus comprises means for receiving compressed picture data compressed by inter-frame prediction coding; means for decoding the compressed picture data; a resolution changer for decreasing the size of the picture data by decreasing resolution; means for omitting frames from the picture data output from the resolution changer; means for changing the order of the picture data; and means for selecting the picture data from one of the means for changing the order and the means for decoding, to reproduce the picture data.

Also in accordance with the present invention, there is provided a method for reproducing picture data, comprising the steps of decoding compressed picture data; storing the picture data with changed resolution in memory; reproducing the picture data from the memory; and controlling the order for reproducing the picture data from the memory.

BRIEF DESCRIPTION OF DRAWINGS

The accompanying drawings, which are incorporated in and constitute a part of the specification, illustrate embodiments of the invention and, together with the general description of the invention given above and the detailed description of the embodiments given below, serve to explain the objects, advantages, and principles of the invention.

FIG. 6(A) illustrates a memory map of memories shown in FIG. 1, and FIG. 6(B) illustrates a memory access map.

FIG. 7(A) illustrates a memory map of the memory illustrated in FIG. 2, and FIG. 7(B) illustrates a memory access map of the memory in FIG. 2.

FIG. 9(A) illustrates an apparatus for reproducing picture data from a storage media for display, and FIG. 9(B) illustrates a decoder included in the apparatus shown in FIG. 9(A).

DESCRIPTION OF THE PREFERRED EMBODIMENTS

Figure 1:
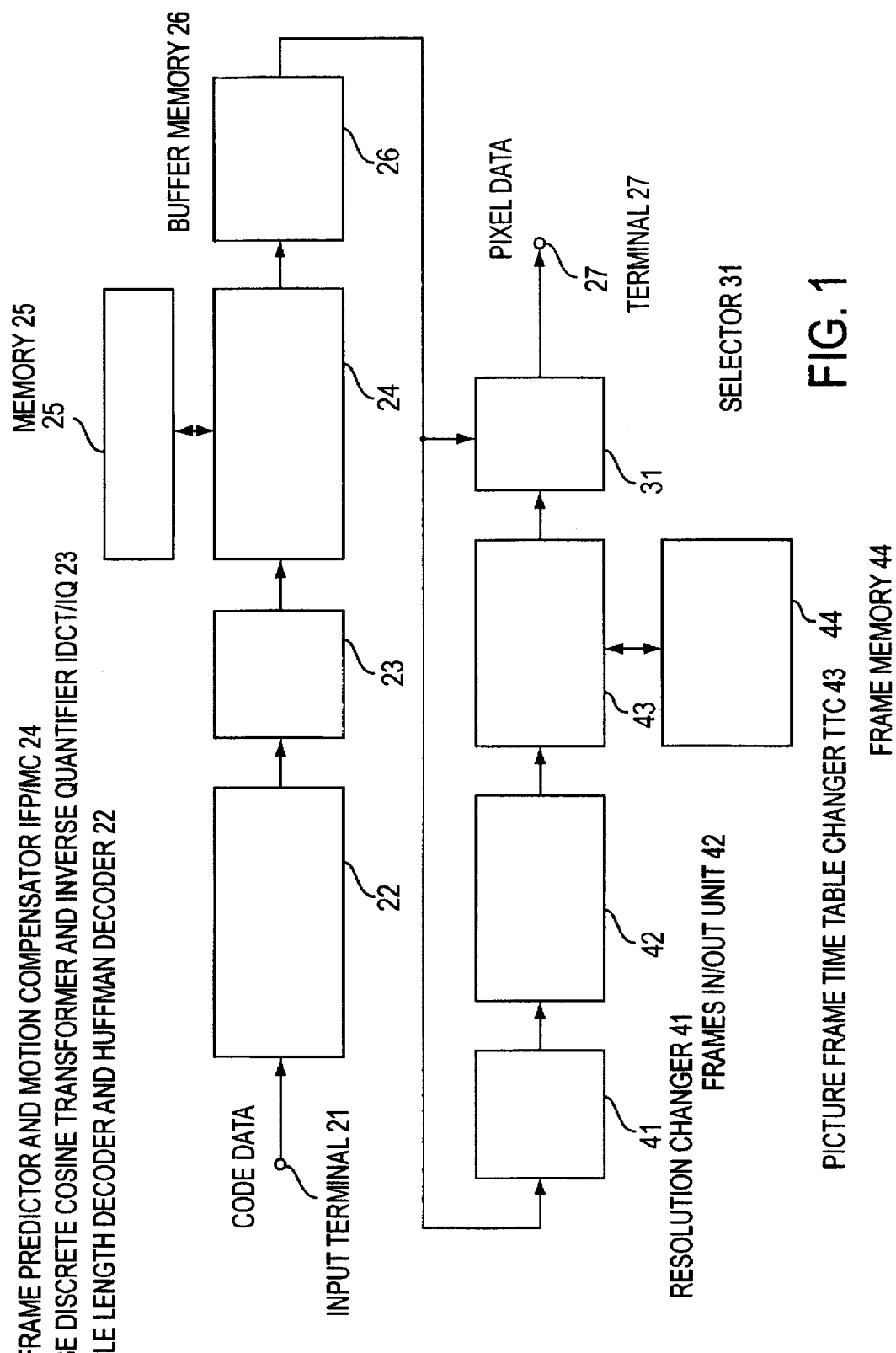
FIG. 1 is a block diagram illustrating an apparatus for performing picture data reproduction in accordance with an embodiment of the invention.

FIG. 1 shows an apparatus constructed in accordance with the invention to carry out a method of the invention. Compressed data in MPEG format is input at input terminal 21. The compressed data is provided to decoder 22, a variable length decoder and Huffman decoder, which decodes the compressed data. The decoded data is then provided to IDCT/IQ unit 23 which performs an inverse discrete cosine transform and inverse quantification. Data from IDCT/IQ unit 23 is provided to IFP/MC unit 24 which performs intra-frame prediction and motion compensation using memory 25. Data from IFP/MC unit 24 is output at output terminal 27 through buffer memory 26 of a picture display.

Data from buffer memory 26 is provided to resolution changer 41 which changes the resolution of the picture data. Picture data from resolution changer 41 is provided to frames in/out unit 42 which omits frames (i.e., removes) or inserts frames into the small sized picture data to decrease or increase the number of frames in order to control the speed of reverse reproduction.

In TTC 43, a unit for changing the picture frame time table, frame order is decided using frame memory 44. The frames from TTC 43 are output to an output terminal 27 through selector 31.

According to the present invention, since the resolution changer 41 changes the resolution of picture data, the amount of picture data stored in frame memory 44 is reduced during picture reproduction which includes changing frame order and controlling reproduction speed.

Figure 2:
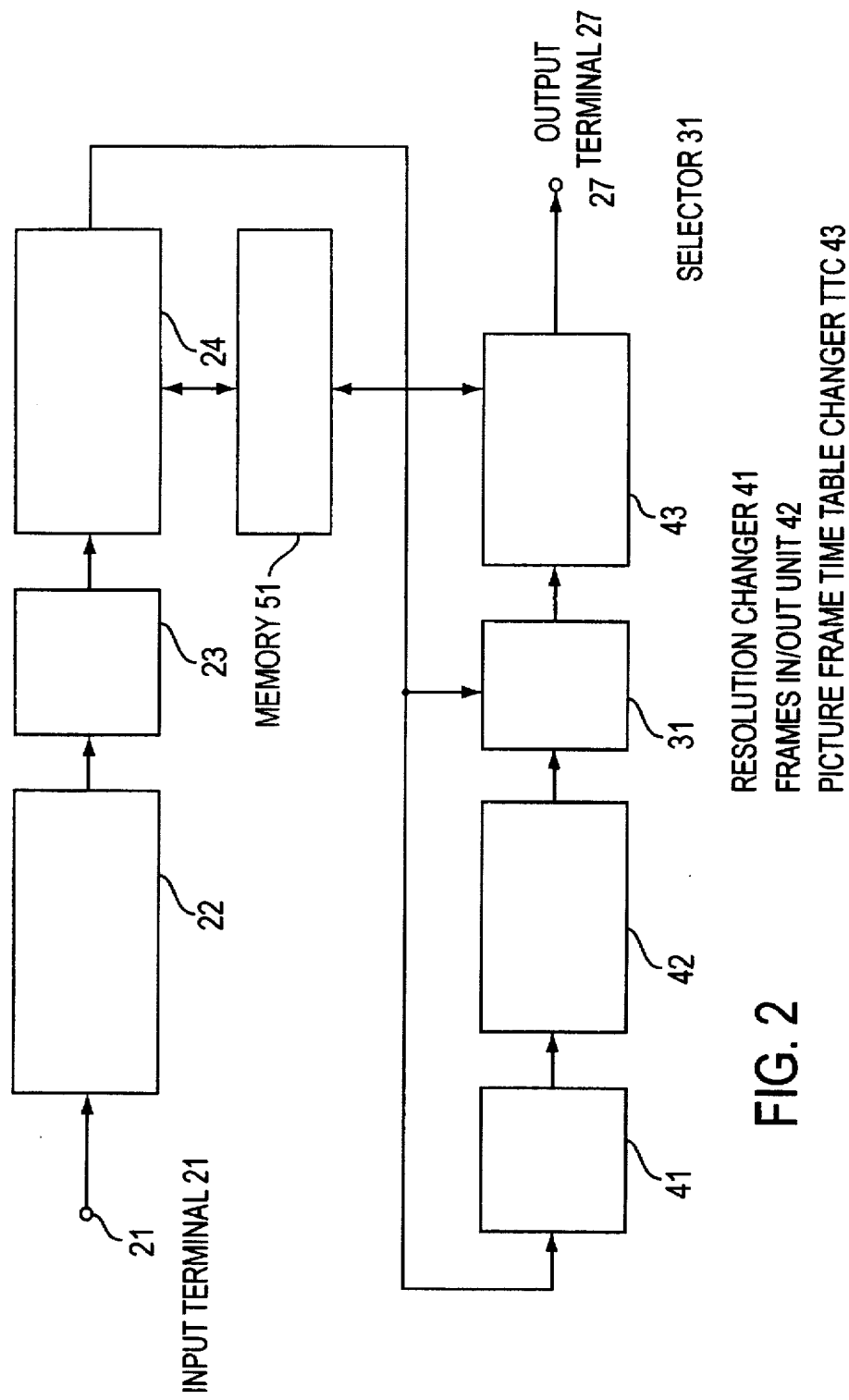
FIG. 2 is a block diagram illustrating an apparatus for performing picture data reproduction in accordance with another embodiment of the invention.

FIG. 2 shows another apparatus constructed in accordance with the invention for carrying out the method of the invention. In FIG. 2, elements which are the same as presented in FIG. 1 are identified by the same reference numerals.

The apparatus in FIG. 2 includes one memory 51 which is used in place of memory 25 and frame memory 44 of FIG. 1.

During picture reproduction, picture data processed by IFP/MC 24, using memory 51, is output at output terminal 27 through selector 31 and TTC 43.

At this time, TTC 43 does not change the frame order.

In reverse reproduction, picture data processed by IFP/MC 24, using memory 51, is provided to resolution changer 41 which changes the picture size of the picture data. The picture data from resolution changer 41 is provided to frames in/out unit 42 which removes picture data frames from or inserts frames into the small sized picture data to decrease or increase the number of frames in order to control the speed of reverse reproduction.

Picture data from frames in/out unit 42 is input to TTC 43 through selector 31. The frame order of the picture data is changed using TTC 43 and memory 51. Picture data from TTC 43 is output at output terminal 27.

In a second embodiment according to the present invention, an apparatus for reproducing picture data can be connected with only the single memory 51. Memory 51 of decreased capacity when the frame order is changed during reproduction and the speed of reproduction is controlled.

Figure 3:
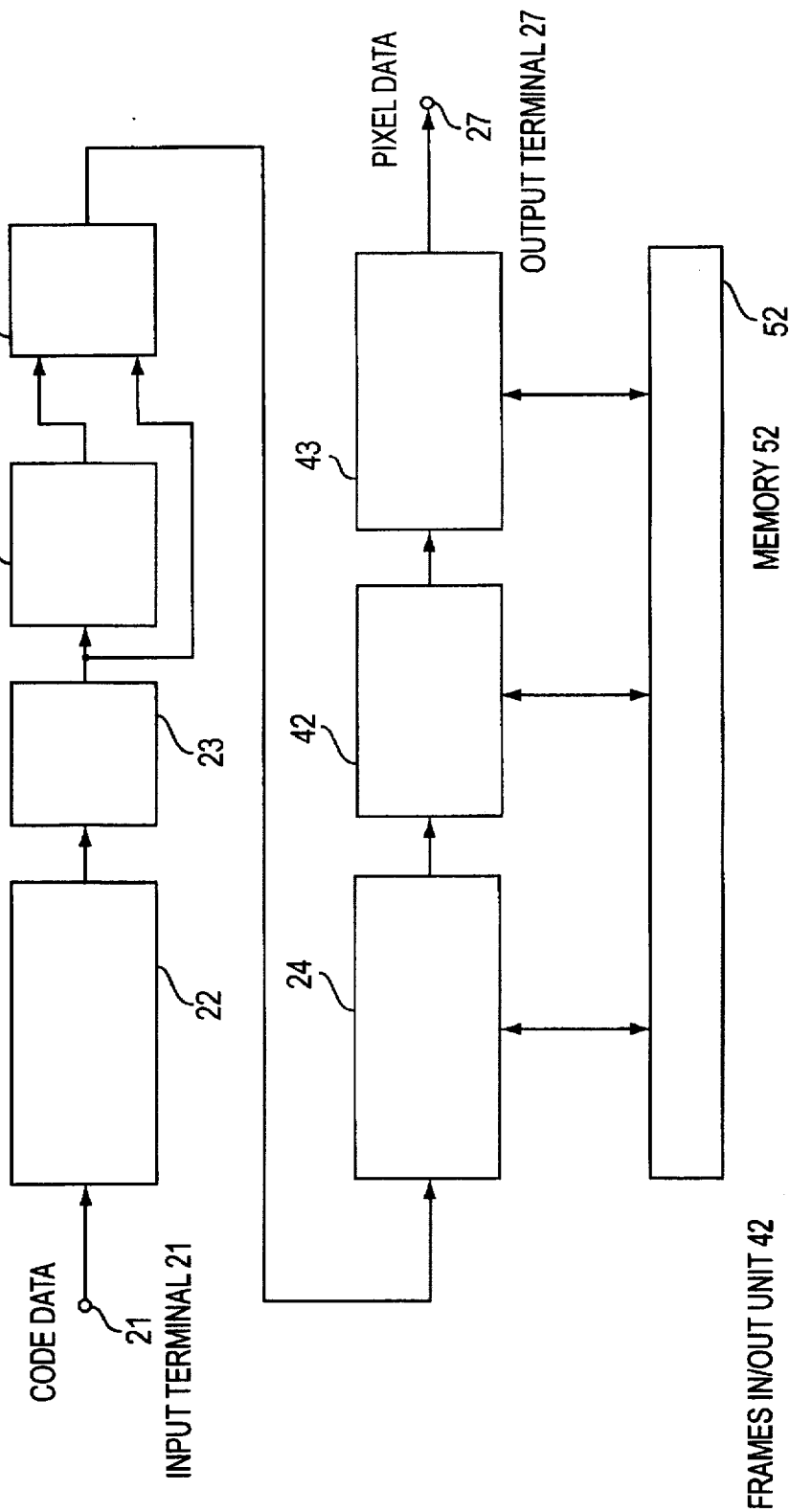
FIG. 3 is a block diagram illustrating an apparatus for picture data reproduction in accordance with a further embodiment of the invention.

FIG. 3 shows another apparatus constructed in accordance with the invention to carry out a method of the invention. In FIG. 3, elements which are the same as presented in FIG. 1 and FIG. 2 are identified by the same numerals. In this case, data from IDCT/IQ 23 is provided to one input of selector 31 and to resolution changer 41. Data from resolution changer 41 is provided to another input of selector 31. Data from selector 31 is provided to IFP/MC 24 which decodes the picture data using memory 52. Picture data from IFP/MC 24 is provided to frames in/out unit 42.

In frames in/out unit 42, picture data frames are omitted or inserted using memory 52. Picture data from frames in/out unit 42 is provided to TTC 43 which uses memory 52 to change the frame order of picture data for reverse reproduction. Picture data from TTC 43 is output at output terminal 27.

During normal picture reproduction, picture data from IDCT/IQ 23 is output to output terminal 27 through selector 31 without omitting frames from the picture data or changing the order of picture data.

In resolution changer 41 in FIG. 3, picture data is changed in each picture block of one frame. For example, in a frame subdivided into an 8×8 grid of 64 picture blocks, resolution changer 41 can reduce the total amount of pixel data by deleting part of the pixel data in each picture block.

Figure 4:
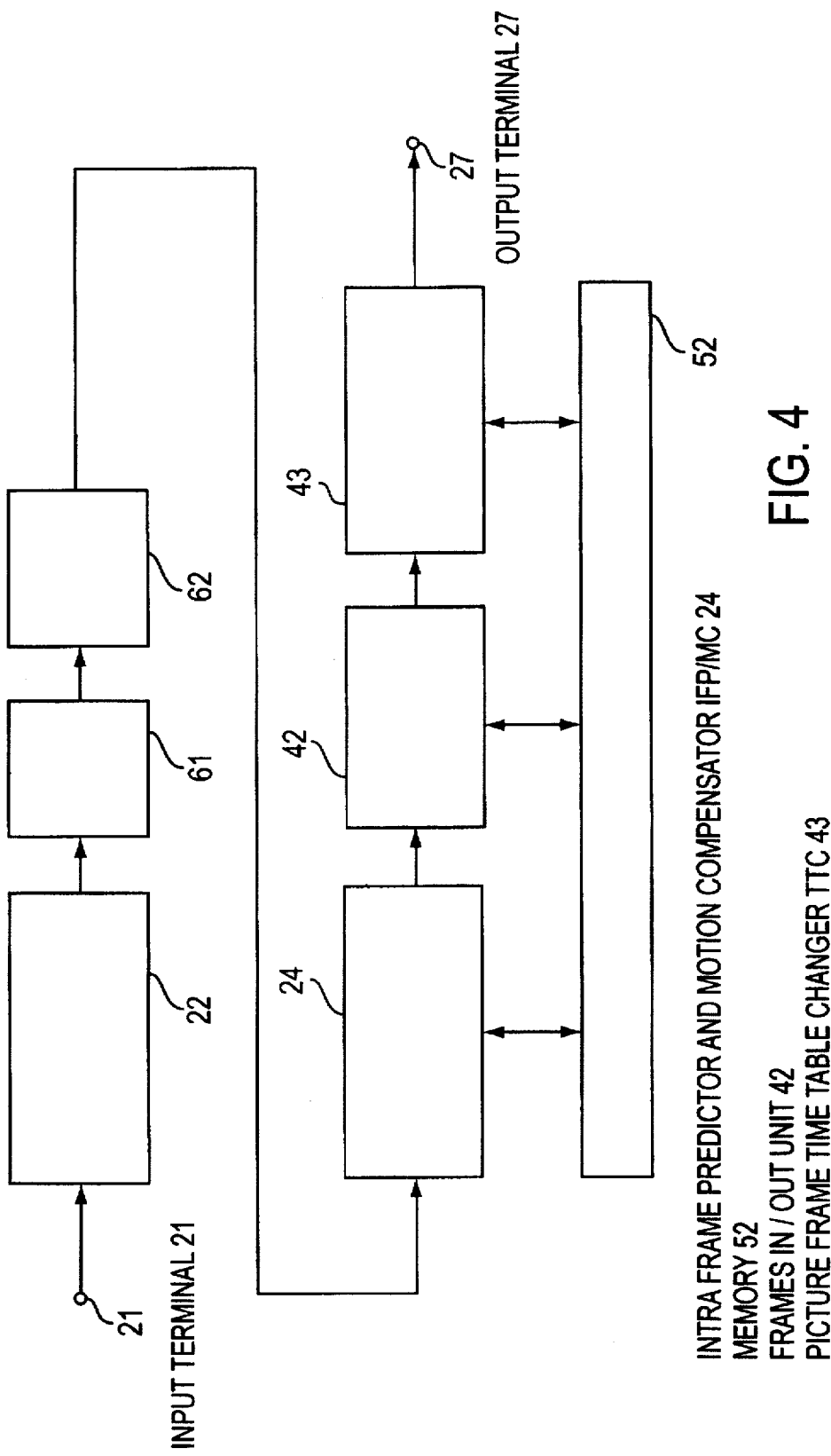
FIG. 4 is a block diagram illustrating an apparatus for performing picture data reproduction in accordance with an additional embodiment of the invention.

FIG. 4 shows another apparatus constructed in accordance with the invention to carry out a method of the invention. In FIG. 4, elements which are the same as presented in FIG. 1, FIG. 2 and FIG. 3 are identified by the same reference numerals. In this case, decoder 22 provides an output to IQ 61, an inverse quantifier. Picture data from IQ 61 is provided to RC/IDCT 62 where the picture data is changed in resolution and inverse discrete cosine transformed. During normal picture reproduction, the picture data is only inverse discrete cosine transformed in RC/IDCT 62 without changing the picture resolution.

Picture data from RC/IDCT 62 is provided to IFP/MC 24 which decodes the picture data using memory 52. Picture data from IFP/MC 24 is provided to frames in/out unit 42.

In frames in/out unit 42, picture data frames are removed from or inserted into the small sized picture data which decreases or increases the number of frames in order to control the speed of reverse reproduction. Picture data from frames in/out unit 42 is provided to TTC 43 which changes the order of picture data frames, using memory 52, for reverse reproduction. Picture data from TTC 43 is output at output terminal 27.

According to the present invention, the picture data is changed in resolution and inverse quantified at the same time. Changing the picture size in the step of inverse discrete cosine transforming is equivalent to a filtering process; therefore, digital filtering is not necessary after changing picture size. Exclusive hardware is not required for changing picture size; therefore, the size of the circuit can be reduced. For example, picture data that a low level of a coefficient of DCT (4 by 4 picture elements) selected from the picture data that inverse quantified as 1 block composed 8 by 8 picture elements. The 4 by 4 picture elements are inverse discrete cosine transformed. It is possible to change picture size on account of brightness according to a rate of reduction. This art of changing picture size is described in "INTERFACE January 1993" in Japan incorporated here in by reference. The art of MPEG1 and 2 (Moving Picture Experts Group Phase 1 and Phase 2) is described in "INTERFACE August 1992" in Japan incorporated here in by reference.

Figure 5:
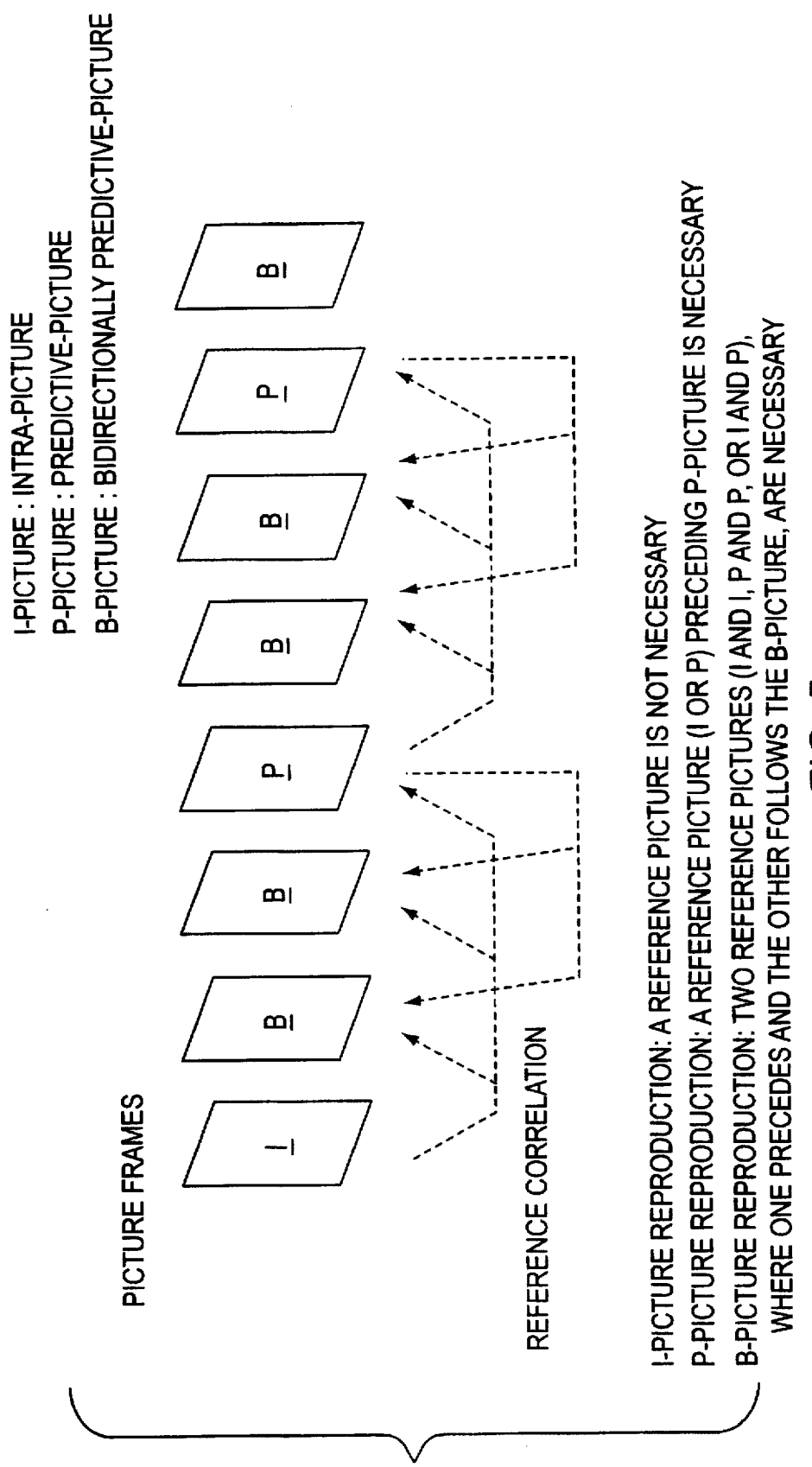
FIG. 5 is a diagram illustrating the processing of compressed coded picture data according to an MPEG standard.

A further explanation regarding memory capacity and a form of using memory in FIGS. 1–4 is described next. FIG. 5 illustrates decompress coding of each frame when reproducing compressed coded picture data according to an MPEG standard, wherein the I frame is an intra-picture, the P frame is a predictive-picture, and the B frame is a bidirectionally predictive-picture.

In reproduction, no reference picture is required to reproduce the I frame. A P frame is reproduced using a preceding I or P frame as a reference picture. A B frame is reproduced from two reference pictures (two I frames, I and P frames, or two P frames) where one frame precedes and the other follows the B frame.

Accordingly, memory capacity for at least two picture data is required in order to store reference picture data for decoding all frames. A buffer memory of about one frame is also required for keeping the balance of output picture data and controlling decoding times.

In view of the above, memory capacity and a form of using memory is determined. FIG. 6(A) shows a map of memory 25, frame memory 44 and buffer memory 26 in FIG. 1. FIG. 6(B) shows a memory access map. In this example, changing the resolution permits ¼ of a frame to represent one picture; therefore, the memory required to reproduce a frame is reduced to ¼ the capacity that would otherwise be required if the resolution were not changed.

FIG. 7(A) shows a map of memory 51 when reproducing and reverse reproducing in FIG. 2. FIG. 7(B) shows a memory access map when reproducing and reverse reproducing in FIG. 2. This illustrates using the output buffer capacity as picture memory for some low resolution picture.

Figure 8A:
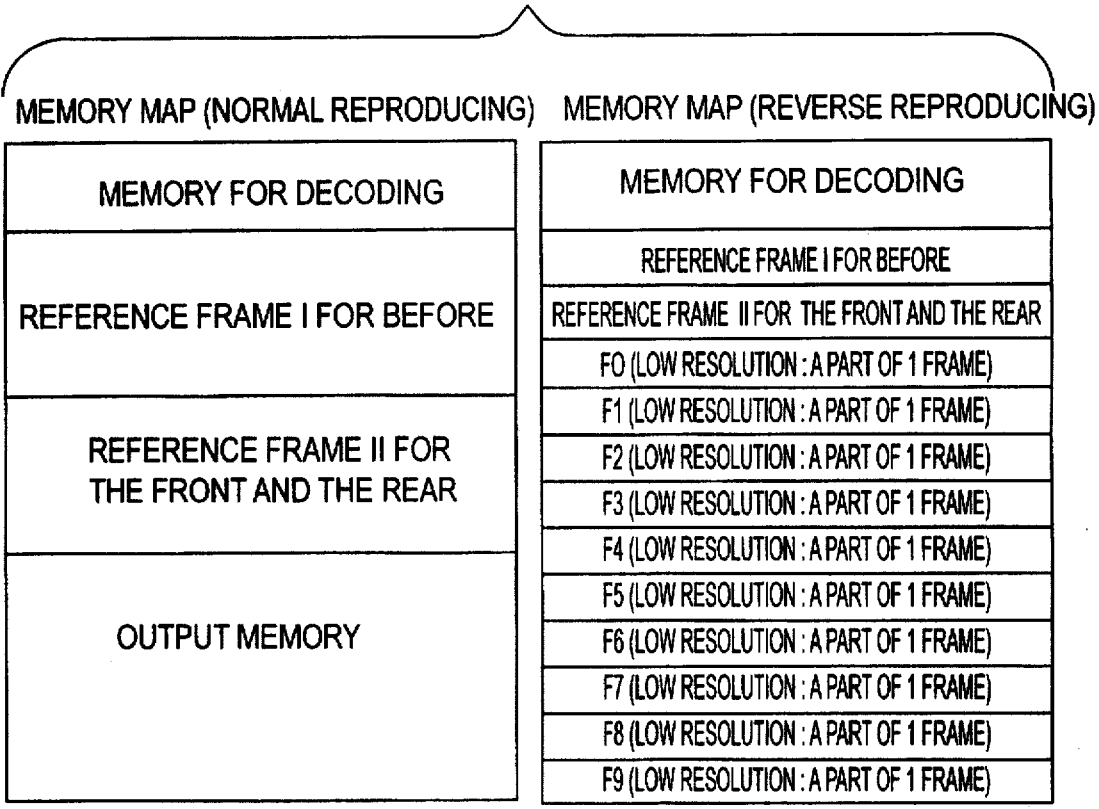
FIG. 8(A) illustrates a memory map of the memory illustrated in FIGS. 3 and 4.
Figure 8B:
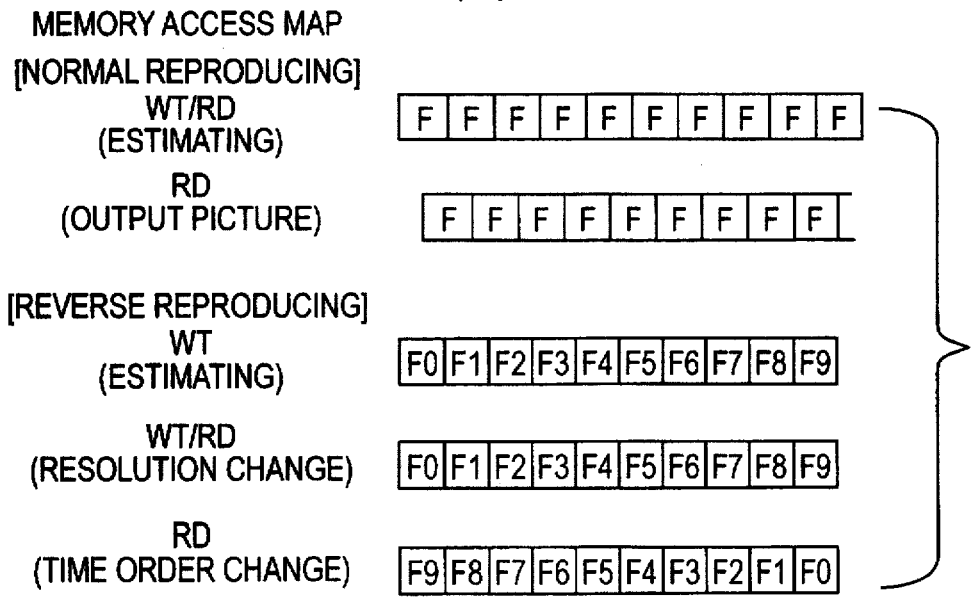
FIG. 8(B) illustrates a memory access map for the memory illustrated in FIGS. 3 and 4.

FIG. 8(A) shows a map of memory 52 when reproducing and reverse reproducing in FIG. 3 and FIG. 4. FIG. 8(B) shows a memory access map when reproducing and reverse reproducing in FIG. 3 and FIG. 4. This illustrates changing the picture data resolution following the inverse discrete cosine transform in block 23 of FIG. 3 or block 62 of FIG. 4. Memory 52 has the capacity to store several frames (e.g., 10 frames in FIG. 8) because only a small amount of memory is required to decode each frame.

According to the present invention, it is possible to reverse reproduce with small scale hardware.

What is claimed is:

1. An apparatus for reproducing picture data, comprising:
(a) means for receiving compressed picture data compressed by inter-frame/intra-frame prediction coding;
(b) means for decoding said compressed picture data;
(c) a resolution changer for decreasing a size of said picture data thereby decreasing the resolution of said picture data;
(d) means for omitting and inserting frames of said picture data from said resolution changer;
(e) means for changing an order of said picture data; and
(f) means for selecting said picture data from one of said means for changing an order and said means for decoding, to reproduce said picture data.

2. An apparatus for reproducing picture data, comprising:
(a) means for receiving compressed picture data compressed by inter-frame/intra-frame prediction coding;
(b) means for decoding said compressed picture data;
(c) a memory coupled to said means for decoding;
(d) a resolution changer for decreasing a size of said picture data thereby decreasing the resolution of said picture data;
(e) means for omitting and inserting frames of said picture data from said resolution changer;
(f) means for selecting said picture data from one of said means for omitting and inserting frames and said means for decoding, to reproduce said picture data; and
(g) means, coupled to said selecting means, for changing an order of said picture data by using said memory to reverse reproduce said picture data.

3. An apparatus for reproducing picture data, comprising:
(a) means for receiving compressed picture data that has been discrete cosine transformed, quantized, and variable encoded to estimate in frames/between frames;
(b) means for variable decoding said compressed picture data;
(c) means for inverse quantizing the variable decoded data;
(d) means for inverse discrete cosine transforming the inverse quantized data;
(e) means, coupled to said inverse discrete cosine transforming means, for changing a resolution of said picture data by decreasing a size of said picture data to provide a lower resolution;
(f) means for selecting said picture data from one of said means for changing a resolution and said inverse discrete cosine transforming means;
(g) means for decompressing data from said means for selecting to form frames;
(h) means for omitting and inserting frames of said picture data from said means for decompressing in a reverse reproducing operation;
(i) means for changing an order of said picture data from said means for omitting and inserting in the reverse reproducing operation; and
(j) a memory for temporarily storing said picture data coupled to said means for decompressing, said means for omitting and inserting, and said means for charting an order.

4. An apparatus for reproducing picture data, comprising:
(a) means for receiving compressed picture data that has been discrete cosine transformed, quantized, and variable encoded to estimate in frames/between frames;
(b) means for variable decoding said compressed picture data;
(c) means for inverse quantizing the variable decoded data;
(e) means, coupled to said means for inverse quantizing, for changing a resolution and inverse discrete cosine transforming said picture data by deleting a portion of pixel data of said picture data;
(f) means for decompressing said picture data from said means for changing a resolution and inverse discrete cosine transforming to form frames;
(g) means for changing an order of the frames of said picture data from said means for decompressing; and
(h) a memory to temporarily store said picture data coupled to said means for decompressing and said means for changing an order of the frames.

5. A method for reproducing picture data, comprising the steps of:
 (a) receiving compressed picture data compressed by inter-frame prediction coding;
 (b) decoding said compressed picture data;
 (c) decreasing a size of said picture data thereby decreasing the resolution of said picture data;
 (d) omitting and inserting frames of said picture data from the step of decreasing;
 (e) changing an order of said picture data; and
 (f) selecting from one of said picture data of changed order and said decoded picture data, to reproduce said picture data.

* * * * *